United States Patent [19]
Ohkubo et al.

[11] Patent Number: 5,932,330
[45] Date of Patent: Aug. 3, 1999

[54] COATED MAGNETIC RECORDING MEDIUM, PAINT FOR COATED MAGNETIC MEDIUM AND METHOD FOR PRODUCING COATED MAGNETIC MEDIUM

[75] Inventors: Takatoshi Ohkubo, Hadano; Yuko Yoshida, Sagamihara, both of Japan

[73] Assignee: Imation Corp., Oakdale, Minn.

[21] Appl. No.: 08/619,746

[22] PCT Filed: Sep. 27, 1994

[86] PCT No.: PCT/US94/11013

§ 371 Date: Mar. 28, 1996

§ 102(e) Date: Mar. 28, 1996

[87] PCT Pub. No.: WO95/09417

PCT Pub. Date: Apr. 6, 1995

[30] Foreign Application Priority Data

Sep. 30, 1993 [JP] Japan ................................ 5-245222
Sep. 30, 1993 [JP] Japan ................................ 5-245231

[51] Int. Cl.$^6$ .................................................. G11B 5/702
[52] U.S. Cl. ......................... 428/216; 428/323; 428/336; 428/425.9; 428/694 BU; 428/694 BG; 428/694 BS; 428/694 BM; 428/900
[58] Field of Search ..................... 428/216, 323, 428/336, 425.9, 694 BU, 694 BG, 694 BS, 694 BM, 900; 427/131

[56] References Cited

U.S. PATENT DOCUMENTS

| | | | |
|---|---|---|---|
| 4,265,931 | 5/1981 | Tamai et al. | 427/48 |
| 4,857,388 | 8/1989 | Ogawa et al. | 428/212 |
| 5,085,941 | 2/1992 | Ohkubo | 428/424.6 |

FOREIGN PATENT DOCUMENTS

| | | |
|---|---|---|
| 0494793 | 7/1992 | European Pat. Off. . |
| 48-98803 | 12/1973 | Japan . |
| 51-62704 | 5/1976 | Japan . |
| 53-60399 | 5/1978 | Japan . |
| 55-19896 | 5/1980 | Japan . |
| 55-19897 | 5/1980 | Japan . |
| 55-162477 | 12/1980 | Japan . |
| 56-41603 | 4/1981 | Japan . |
| 56-114217 | 9/1981 | Japan . |
| 56-157438 | 12/1981 | Japan . |
| 57-53825 | 3/1982 | Japan . |
| 57-74828 | 5/1982 | Japan . |
| 57-135433 | 8/1982 | Japan . |
| 59-3723 | 1/1984 | Japan . |
| 59-188831 | 10/1984 | Japan . |
| 60-38725 | 2/1985 | Japan . |
| 61-59623 | 3/1986 | Japan . |
| 61-180927 | 8/1986 | Japan . |
| 62-124624 | 6/1987 | Japan . |
| 63-103429 | 1/1988 | Japan . |
| 1-94523 | 4/1989 | Japan . |
| 2-63257 | 12/1990 | Japan . |
| 5-101373 | 4/1993 | Japan . |

Primary Examiner—Stevan A. Resan
Attorney, Agent, or Firm—Eric D. Levinson

[57] ABSTRACT

A coated magnetic recording medium includes a nonmagnetic support, a primer layer formed on the nonmagnetic support, and an upper magnetic layer formed on the primer layer. The primer layer and the upper magnetic layer contain, as a binder, a polyurethane resin and a polyvinyl chloride base resin. The weight ratio of the polyurethane resin to the polyvinyl chloride base resin in the primer layer is from 70:30 to 90:10, and the weight ratio of the polyurethane resin to the polyvinyl chloride base resin in the upper magnetic layer is from 20:80 to 40:60. A method for producing the coated magnetic recording medium is also described.

9 Claims, 1 Drawing Sheet

COATED MAGNETIC RECORDING MEDIUM, PAINT FOR COATED MAGNETIC MEDIUM AND METHOD FOR PRODUCING COATED MAGNETIC MEDIUM

FIELD OF THE INVENTION

The present invention relates to a coated magnetic recording medium which has a magnetic layer with excellent surface smoothness, electromagnetic conversion characteristics, still durability and slitting properties. The present invention further relates to a paint for the coated magnetic recording medium and a method for its production.

DESCRIPTION OF RELATED ART

Recent advances in the recording art require magnetic recording media, such as video tapes, audio tapes, data cartridge tapes or floppy discs, to have increased recording density or increased recording capacity per unit volume.

To increase recording density, the following avenues have been explored:(1) improving the surface smoothness of the magnetic layer, (2) decreasing the thickness of the magnetic layer, (3) miniaturizing the particle sizes of the magnetic material, (4) increasing the coercive force (Hc) of the magnetic material, and (5) concentrated packing of the magnetic material.

With video tape, audio tape or data cartridge tape, recording capacity per unit volume has been increased by increasing recording capacity (or extending recording time) as a whole while maintaining size. This has been achieved by decreasing the total thickness of the magnetic tape and increasing its length, or, by decreasing the width of the magnetic tape so that a smaller cassette or cartridge can be used.

When the total thickness of the magnetic tape is decreased and its length is increased, the following problems arise:

i) The decrease in size and/or thickness of the magnetic layer adversely affects the electromagnetic conversion characteristics, and deterioration of the reproducing output may occur.

ii) When the nonmagnetic support for the tape is thinner, the "cushioning effect", which absorbs impact applied on the magnetic layer when it contacts the magnetic head, is decreased. The magnetic layer is then easily damaged, which deteriorates still durability.

To solve the above problems, Japanese Patent Publication No. 2-63257 discloses a floppy disc comprising a polyester support, a nonmagnetic primer layer and a magnetic layer applied on the primer layer. The primer layer has a thickness of 2 mm or less and comprises a three dimensional crosslinked resin having a Young's modulus of 100 to 8000 kg/cm$^2$. The '257 Publication teaches that a polyurethane resin and vinyl chloride base resin (vinyl chloride-vinyl acetate-vinyl alcohol copolymer) are preferred as the resins for the primer layer and the magnetic layer. However, since the primer layer contains no nonmagnetic powder, and has few voids, the following problem arises.

It is well known in the art that the magnetic layer may be calendered to improve its surface smoothness. However, in the invention described in the 'b 257publication the calendering is not effective, and the magnetic layer surface cannot be smoothed to a satisfactory level. Accordingly, the electromagnetic conversion characteristics, such as, for example, reproducing output in the high frequency range, RF output or S/N ratio in the low frequency range, and chroma S/N are insufficient to achieve high recording density.

Japanese Patent Kokai Publication No. 1-94523 discloses a magnetic recording medium comprising a nonmagnetic layer containing nonmagnetic powder. The disclosed coated magnetic recording medium comprises a polyethylene terephthalate support, a primer layer formed on the support which comprises a nonmagnetic powder (e.g. titanium oxide, carbon black, etc.), vinyl chloride base resin (vinyl chloride-vinyl alcohol copolymer), and a polyurethane resin having a solubility parameter of 9.0 to 9.5. A magnetic layer formed on said primer layer comprises a ferromagnetic powder and a binder containing a vinyl chloride resin (vinyl chloride-vinyl alcohol copolymer) and a lower molecular weight isocyanate compound. The '523 Kokai Publication teaches that the inclusion of a polyurethane resin as a binder in the magnetic layer improves overall performance.

To solve the above problems, Japanese Patent Kokai Publication No. 63-103429 proposes the formation of a coated magnetic layer with two sub-layers, a first (lower) layer with a Young's modulus of 500 to 1000 kg/mm$^2$, and a second (upper) layer with a Young's modulus of at least 1300 kg/mm$^2$. The Young's modulus of the whole magnetic layer is at least 900 kg/mm$^2$. The '429 Kokai Publication states performance can be achieved when binders contained in both the upper and lower magnetic layers contain a vinyl chloride base resin and a polyurethane resin.

However, in the above-described coated magnetic materials, if a film carrying the magnetic layer is slit to form a tape, the magnetic layer is damaged or cracked at the slit edge areas, i.e. the slitting properties are deteriorated. Therefore, since the magnetic layer in the edge areas tends to separate from the nonmagnetic support, still durability is unsatisfactory, or the number of drop outs increases.

The calendering of these materials is difficult, and the magnetic layer surface cannot be smoothed to a satisfactory level. Accordingly, the electromagnetic conversion characteristics deteriorate, and high recording density cannot be achieved.

The methods for producing such multiple layer coated magnetic recording medium having a lower primer layer, such as a nonmagnetic layer or a lower magnetic layer, and an upper magnetic layer are roughly classified into:

a) a wet-on-wet method comprising coating an upper magnetic layer on a lower primer layer which is still in a wet (green) state, and b) a wet-on-dry method comprising coating an upper magnetic layer on a lower primer layer which has been dried.

In the wet-on-dry method b), the surface smoothness and squareness ratio of the upper magnetic layer deteriorates, while the wet-on-wet method a) does not have such drawbacks (See, e.g. Japanese Patent Kokai Publication No. 48-98803).

However, the wet-on-wet method a) still has the following drawbacks:

1) Since the magnetic materials in the upper and primer layers are simultaneously oriented, the direction and/or a degree of orientation of the magnetic material in each layer cannot be freely controlled.

2) The paints for the upper magnetic layer and the primer layer should have relatively similar properties, for example, the binder should be similar or even identical. In the wet-on-wet method, freedom to design the composition of the upper and primer layers is limited.

3) The structure of the coating head used to produce these layered materials is complicated.

The above drawbacks 2) and 3) do not occur in the wet on-dry method b).

Some improvements have been proposed on the wet on-dry method b). For example, Japanese Patent Kokai Publication No. 57-135433 discloses a multiple-layer coated magnetic recording medium which uses, as a binder in the magnetic primer layer, a vinyl chloride-vinyl acetate copolymer with active hydrogens, a polyurethane resin with at least two hydroxyl groups and an isocyanate compound with at least two isocyanate groups and a molecular weight of 10,000 to 30,000. Japanese Patent Kokai Publication No. 51-62704 (Application No. 49-125196) discloses a method for producing a multiple-layer coated magnetic recording medium comprising contacting a magnetic primer layer with a solvent in which the lower magnetic layer is insoluble before a magnetic paint for an upper magnetic layer is coated on the lower magnetic layer, although it does not disclose the application of this method to a mixture of a polyurethane resin and a polyvinyl chloride base resin as a binder. These methods can overcome the above described drawbacks of the wet-on-dry method b), particularly ready deterioration of surface smoothness and the squareness ratio of the upper magnetic layer.

SUMMARY OF THE INVENTION

In the above methods, surface treatment (calendering) or curing (hardening) is necessary after the coating and drying of the lower primer layer, to coat the magnetic paint of the upper layer without dissolving the lower primer layer. Therefore, it is difficult to continuously coat the upper magnetic layer on the lower primer (magnetic or nonmagnetic) layer without calendering or curing the lower layer, and the conventional methods described above do not address this problem. When a binder mixture of a polyurethane resin and a polyvinyl chloride base resin, which is most suitable for improving various properties of the magnetic recording medium, is used in both the lower primer layer and the upper magnetic layers, the known methods are still unsatisfactory.

To solve the above problem, the present invention provides a multiple-layer coated magnetic recording medium comprising a nonmagnetic support, a primer layer formed on the support, and an upper magnetic layer formed on the primer layer. The primer layer may be a non-magnetic layer or a magnetic layer, or may include both magnetic and nonmagnetic layers.

In one embodiment, the present invention provides a multiple layer coated magnetic recording medium comprising a non-magnetic support with a magnetic primer layer formed thereon, and an upper magnetic layer formed on the magnetic primer layer. The upper and lower magnetic layers comprise, as a binder, a mixture of a polyurethane resin and a polyvinyl chloride base resin. The weight ratio of the polyurethane resin to the polyvinyl chloride base resin in the magnetic primer layer is from 70:30 to 90:10, and the weight ratio of the polyurethane resin to the polyvinyl chloride base resin in the upper magnetic layer is from 20:80 to 40:60.

In another embodiment, the present invention provides a coated magnetic recording medium comprising a nonmagnetic support, a nonmagnetic primer layer containing nonmagnetic powder formed on the nonmagnetic support, and an upper magnetic layer formed on the nonmagnetic layer. The nonmagnetic primer layer and upper magnetic layer comprise, as a binder, a mixture of a polyurethane resin and a polyvinyl chloride base resin. The weight ratio of the polyurethane resin to the polyvinyl chloride base resin in the nonmagnetic primer layer is from 70:30 to 90:10, and the weight ratio of the polyurethane resin to the polyvinyl chloride base resin in the upper magnetic layer is from 20:80 to 40:60.

In yet another embodiment, the present invention provides a coated magnetic recording medium comprising a nonmagnetic support, a primer layer and an upper magnetic layer. The primer layer comprises a nonmagnetic layer containing nonmagnetic powder formed on the nonmagnetic support, and a magnetic primer layer formed on the nonmagnetic layer. An upper magnetic layer is formed on the magnetic primer layer. The nonmagnetic and magnetic primer layers, and upper magnetic layer comprise, as a binder, a mixture of a polyurethane resin and a polyvinyl chloride base resin. The weight ratio of the polyurethane resin to the polyvinyl chloride base resin in the nonmagnetic layer and the magnetic primer layer is from 70:30 to 90:10, and the weight ratio of the polyurethane resin to the polyvinyl chloride base resin in the upper magnetic layer is from 20:80 to 40:60.

Also, the present invention provides a paint for the above coated magnetic recording medium. The paint comprises cyclohexanone and/or 1,4-dioxane as a solvent for the primer layer. A solvent containing toluene and/or xylene is used for the magnetic paint of the upper magnetic layer.

Preferably, the paint solvent for the primer layer contains at least 5% by weight cyclohexanone and/or 1,4-dioxane based on the total weight of the solvent, and the paint solvent for the upper magnetic layer contains at least 65% by weight toluene and/or xylene based on the total weight of the solvent.

Further, the present invention provides a method for producing a coated magnetic recording medium comprising steps of coating a paint for a magnetic or nonmagnetic primer layer, coating a magnetic paint for an upper magnetic layer on the primer layer, and drying the coated magnetic paint to form an upper magnetic layer.

DETAILED DESCRIPTION OF THE INVENTION

Figure 1:
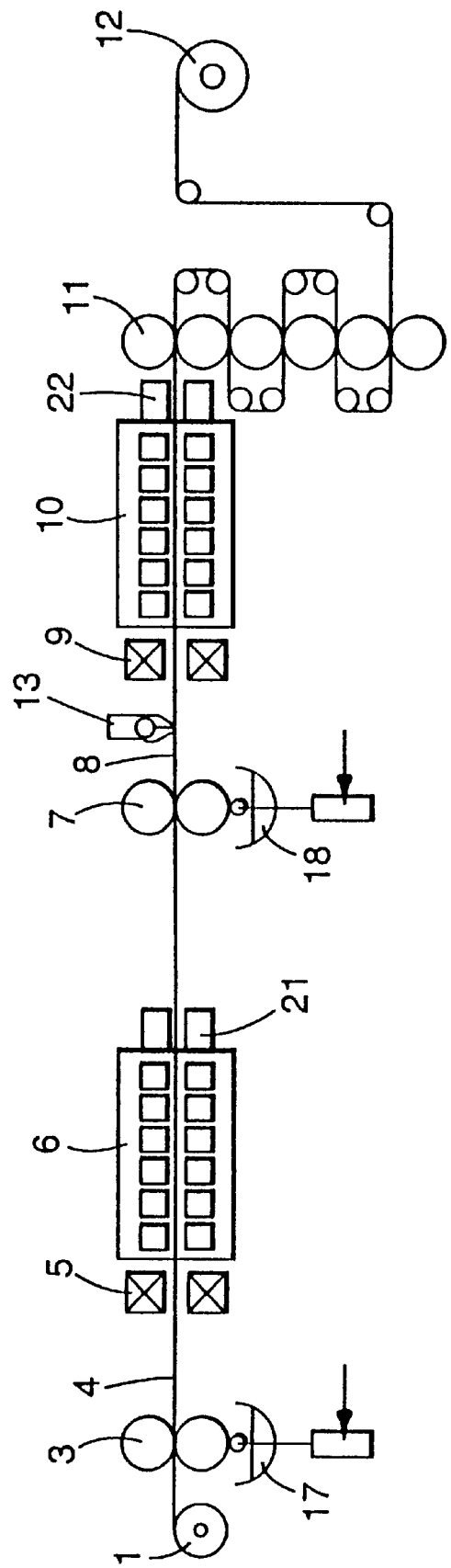
FIG. 1 schematically shows an apparatus for producing the coated magnetic recording medium according to the present invention.

The layers of the multiple-layer coated magnetic recording medium according to the present invention contain a binder mixture comprising a polyurethane resin and a polyvinyl chloride base resin.

The polyurethane resin and the polyvinyl chloride base resin improve the dispersability of both magnetic and nonmagnetic material, and increase the amount of magnetic or nonmagnetic material which may be packed in the layers. These resins also improve the surface smoothness of the magnetic layer. When similar kinds of binder resins are contained in the magnetic and nonmagnetic layers, adhesion improves between the nonmagnetic and magnetic layers.

The weight ratio of the polyurethane resin to the polyvinyl chloride base resin in the primer layers (nonmagnetic layer or magnetic layer) is from 70:30 to 90:10, while the weight ratio of the polyurethane resin to the polyvinyl chloride base resin in the upper magnetic layer is from 20:80 to 40:60.

If the ratios of the two binders in the layers are maintained in the above ranges, the following beneficial effects are noted:

(1) When the film is slit to form a tape, the upper magnetic layer does not break or crack in the slit edge areas, so slitting properties of the material are improved. The separation of the magnetic or nonmagnetic primer layers from the nonmagnetic support in the edge regions is also reduced, the still durability is improved, and the number of drop outs decreases.

(2) Calendering is much more effective, and the surface smoothness of the upper magnetic layer is improved. Thus, the electromagnetic conversion characteristics can be improved to increase recording density.

(3) When the magnetic head contacts the upper magnetic layer, impact applied on the upper magnetic layer is absorbed, creating a "cushioning effect". This prevents wear and damage to the upper magnetic layer, and increases still durability.

(4) The adhesion between the nonmagnetic and magnetic layers is enhanced, which improves still durability and decreases the number of drop outs.

(5) The magnetic head touch to the upper magnetic layer surface is good, so reproducing output and S/N are improved.

When the weight ratios of the two binders are outside the above ranges, at least one of the beneficial effects is not obtained.

Any conventionally used polyurethane resins may be used without limitation in the present invention. For example, a polyurethane resin conventionally prepared from a) a polyol component; b) a diisocyanate component; and, optionally, c) a chain extender can be used. Suitable polyol components include, for example, polyetherdiol, polyesterdiol, polycarbonatediol, polycaprolactonediol, and polycaprolactonetriol. Diisocyanate components which may be used in the invention include, for example, 4,4-diphenylmethane diisocyanate (MDI), hexamethylene diisocyanate, tolylene diisocyanate, isophorone diisocyanate, and 4,4 dicyclohexylmethane diisocyanate (hydrogenated MDI). Chain extenders which may be used in the binders of the invention include ethylene glycol, propylene glycol, butanediol, 1,6 hexanediol, neopentyl glycol, etc.

The polyurethane resins may be the same or different in the nonmagnetic or magnetic primer layers and the upper magnetic layers.

Preferably, the nonmagnetic or magnetic primer layer contains a polyurethane resin with a urethane group concentration of 2.0 to 3.6 mmol/g and a number average molecular weight of 1000 to 15,000, and the upper magnetic layer contains a polyurethane resin having an urethane group concentration of 1.5 mmol/g or less. The urethane group concentration in the polyurethane resin can be adjusted by changing the molecular weight of the polyol component or a composition of the polyol component, the diisocyanate component and the chain extender.

As the urethane group concentration increases, the modulus or breaking strength of the polyurethane resin is larger, and resistance to organic solvent improves. As the breaking strength is increased, toughness of the magnetic layer increases, and the cushioning effect, which absorbs the impact applied to the upper magnetic layer when it contacts the magnetic head improves. Accordingly, a polyurethane resin with the above urethane group concentration is preferable as the polyurethane resin for the magnetic or nonmagnetic coatings.

In addition, when the method for producing the present invention is used, a polyurethane resin with a higher urethane group concentration is preferred for the primer layer, since resistance to the solvent contained in the magnetic paint of the upper magnetic layer is increased.

A polyurethane resin in the upper magnetic layer that suppresses the brittleness of the binder containing the larger amount of the polyvinyl chloride base resin is preferred. A polyurethane resin with a lowered Tg and increased elongation at break by the reduction of the urethane group concentration is preferred for use in the upper magnetic layer. A polyurethane resin with a lower urethane group concentration is preferred since the resin is easily dissolved in the toluene or xylene contained in the magnetic paint of the upper magnetic layer.

The molecular weight of each of the polyurethane resins is not limited, and polyurethane resins with a number average molecular weight of about 1000 to 50,000 may be used. In particular, for the primer layer, a polyurethane resin with a number average molecular weight of 1000 to 15,000 is preferred. When the polyurethane resin with a molecular weight in this range is used in the primer layer, slitting properties and calendering effects improve. When the polyurethane resin with a molecular weight in this range is used in a larger amount, the flowability of the paint of the primer layer increases, so the surface smoothness of the upper magnetic layer is improved.

Any conventionally used polyvinyl chloride base resin may be used without limitation. For example, vinyl chloride-vinyl acetate copolymers, vinyl chloride-vinyl acetate-vinyl alcohol copolymers, vinyl chloride vinyl acetate-maleic acid copolymers, vinyl chloride-vinyl acetate acrylic acid copolymers, vinyl chloride-vinyl acetate-acrylate copolymers, vinyl chloride-vinyl acetate-methacrylate copolymers, and the like may be used.

The polyurethane resin and the polyvinyl chloride base resin preferably have a hydrophilic polar group to increase the dispersability of the magnetic material, as well as nonmagnetic materials such as carbon black and abrasives (e.g., a-alumina).

Examples of the hydrophilic polar group are sulfonic acid or sulfonic acid metal salt groups, carboxylic acid or carboxylic acid metal salt groups, phosphoric acid or phosphorate ester groups, a hydroxyl group, an epoxy group, an amino group, a quaternary ammonium group and sulfobetaine group. A polyurethane resin with the sulfonic acid metal salt group and the hydroxyl group at a position other than at the molecular ends is preferred, i.e., along the molecular backbone, and the polyvinyl chloride base resin with the sulfonic acid metal salt group, the epoxy group or the hydroxy group is preferred. These polyurethane and polyvinyl chloride base resins are disclosed in U.S. Pat. No. 5,085,941.

A polyurethane resin, the synthesis of which is described as "Binder E" in the above U.S. '941 Patent may be used in the present invention; UR-5537, UR-8200, UR-8300 and UR-8700 (all manufactured by Toyobo); and the like may also be used.

The polyvinyl chloride base resins MR-110, MR-113 and MR-120 (all manufactured by Nippon Zeon Co., Ltd.) may be used in the present invention.

In addition to the polyurethane resin and the polyvinyl chloride base resin, other binder resins may be used. In such cases, the total amount of the polyurethane resin and the polyvinyl chloride resin is at least 80% by weight, preferably at least 90% by weight based on the total binder weight (minus the weight of a curing agent, which will be explained below).

Other binder resins such as polyester resins, polycarbonate resins, cellulose resins (e.g., nitrocellulose), epoxy resins, phenoxy resins, polystyrene base resins, polyvinyl fluoride resins, silicone resins, electron beam-curing acrylic resins and the like may be used in the present invention.

The thickness of the primer layer is usually from about 1.1 to 1.8 μm, and that of the upper magnetic layer is about 1.5 μm or less.

When the upper magnetic layer is thinner than 1.1 μm, the slitting properties deteriorate, and calendering is much less effective to smooth the layer. The head touch and still durability also deteriorate. When the upper magnetic layer is thicker than 1.8 μm, the interface between the upper magnetic layer and the primer layer is uneven. When the magnetic paint for the upper magnetic layer is coated on the primer layer, the surface smoothness of the upper magnetic layer decreases.

When multiple coating is carried out using the wet-on-dry method, since the primer layer absorbs the solvent of the paint of upper magnetic layer, the flowability of the coated paint of upper magnetic layer is reduced, and the formation of a smooth surface on the upper magnetic layer is difficult.

When the primer layer is not calendered before the formation of the upper magnetic layer, the thickness of the primer layer should not be larger than about 1.8 mm to prevent uneven drying of the paint of the upper magnetic layer. Such uneven drying leads to the roughening of the upper magnetic layer surface.

When the upper magnetic layer is thicker than 1.5 μm, the slitting properties deteriorate. When both the upper magnetic layer and primer layers are too thick, the magnetic tape is too thick, so increased magnetic capacity per unit volume and extended recording time cannot be achieved.

The upper magnetic layer and the primer layer may contain a surfactant to improve dispersion of magnetic and nonmagnetic material, prevent electrification of the magnetic layers, accelerate the crosslinking reaction (which leads to the improvement of modulus and breaking strength), improve the flowability of the magnetic paints (decrease the apparent viscosity), or decrease surface tension.

In the present invention, any conventional surfactant may be used without limitation. For example, natural surfactants, such as fatty acids having 2 to 40 carbon atoms or their metal salts, aromatic carboxylic acids, alkylsulfonic acids, phenylsulfonic acid, higher alkylamines, quaternary ammonium salt compounds, sulfosuccinic acid, soybean lecithin, saponin, etc.; synthetic surfactants, such as sorbitan esters, polyethylene glycols, etc.; alkylbetaine such as sulfobetaine, and the like may be used. Phosphate esters are preferred. A surfactant which has a polypropylene glycol chain having a terminal hydroxyl group as a hydrophobic group and a monoalkyl phosphate group as a hydrophilic group is particularly preferred for use in the invention. This type of surfactant is superior to other surfactants for the following reasons:

i) The monoalkyl phosphate is more hydrophilic than diallyl and trialkyl phosphates, and the polypropylene glycol chain is more hydrophobic than a polyethylene glycol chain. Therefore, the balance between the hydrophilicity and hydrophobicity is good, and good surface activity is obtained. In particular, this surfactant improves the dispersion of the magnetic material and the nonmagnetic material such as a-alumina, and also the surface smoothness and wear resistance of the primer layer.

ii) The hydrophilic monoalkyl phosphate group is strongly absorbed on the surfaces of magnetic material or nonmagnetic powder in the paint, and it suppresses absorption of organic solvent molecules on the magnetic or nonmagnetic material surface. Further, the polypropylene glycol chain has a large excluded volume, so it limits the interaction of the magnetic material or nonmagnetic powder particles. Accordingly, the flowability of the magnetic paint is improved.

iii) In comparison with surfactants with other structures, this type of surfactant has better compatibility with other organic solvents (e.g. toluene, xylene, methyl ethyl ketone, etc.), and the polyurethane resin and the polyvinyl chloride base resin, so that the dispersion stability of the magnetic material and the nonmagnetic powder in the paint is maintained.

iv) The molecular end with the hydroxyl group reacts with the polyisocyanate compound and the like and participates in a cross-linking structure together with the binder in the upper magnetic and primer layers, whereby the modulus of the upper magnetic or primer layer increases.

The average molecular weight of the phosphate is not limited, and is preferably from 400 to 1000. A phosphate of this type is described in detail in Japanese Patent Kokai Publication No. 5-101373.

The surfactants used may be the same or different and their contents may be the same or different in the nomnagnetic and magnetic layers of the primer layers and the upper magnetic layers. Preferably, only the upper magnetic layer contains the phosphate of the above structure, while the lower magnetic layer or nonmagnetic layer in the primer layer does not. The reasons are as follows:

i) The modulus of the upper magnetic layer is increased, while flexibility is imparted to the magnetic or nonmagnetic layer in the primer layer. Consequently, the above described slitting properties and calendering effects are improved.

ii) The flowability of the magnetic paint of the upper magnetic layer is increased, i.e., the apparent viscosity is decreased, and a smooth upper magnetic layer is formed.

iii) When a larger amount of toluene or xylene is used in the solvent of the magnetic paint of the upper magnetic layer, the dispersion stability of the magnetic material and the nonmagnetic material is improved.

The amount of the phosphate of the above structure in the upper magnetic layer may vary widely. Preferably, it is from 1 to 8 parts by weight per 100 parts by weight of the magnetic material in the upper magnetic layer.

Any conventional magnetic material may be used without limitation in the present invention. For example, magnetic iron oxide [g-$FeO_x$ and Co-containing (coated, modified or doped) g-$FeO_x$ (x=1.33–1.50)], magnetite [$Fe_3O_4$ and Co-containing (coated, modified or doped) $Fe_3O_4$], magnetic chromium oxide ($CrO_2$), ferromagnetic metal powder (a-Fe, alloys of iron with Co or Ni), hexagonal system ferrite (barium ferrite, strontium ferrite, lead ferrite, calcium ferrite, or their substituted materials), hyper magnetite (FeO) $_y\cdot Fe_2O_3$(Y=1.1–1.4); and acicular Co-doped hypermagnetite which is disclosed in Japanese Patent Kokai Publication No. 53-60399 may be used. The magnetic material preferably has a BET surface area of 10 to 80 m$^2$/g, and Hc of 250 to 2000 Oe.

While a single magnetic material is generally contained in a magnetic layer, it is possible to use two or more kinds of magnetic materials in combination, depending on the intended use of the magnetic recording medium. For example, the following combinations of the magnetic materials may be used:

Magnetic material A: BET=15–25 M$^2$/g, Hc=300–4500 Oe

Magnetic material B: BET=35–50 M²/g, Hc=600–9000 Oe.

When a mixture of two magnetic materials is used in a magnetic layer, the reproducing output can be increased over a wide frequency range, and balance (frequency characteristics) may also be improved without forming two or more separate magnetic layers. In addition, packing of the magnetic material in the magnetic layer is increased.

The type of magnetic materials used in the magnetic layers may be the same or different in the upper and magnetic primer layers, depending on the intended use of the multiple-layer primer magnetic medium. In a multiple-layer coated magnetic recording medium where an upper magnetic layer records and reproduces the signals in the high frequency range while a lower magnetic layer in the primer layer records and reproduces the signals in the low frequency range, the magnetic materials used in the upper and magnetic primer layers differ. In such a case, relationships of the properties of the magnetic materials in the upper and magnetic primer layers are preferably as follows:

Size (major axis size, crystal particle size, etc.):
magnetic primer layer>upper magnetic layer
BET: magnetic primer layer<upper magnetic layer
Hc: magnetic primer layer<upper magnetic layer As the frequency range of the signals increases, the S/N and the reproducing output are improved when the size of the magnetic material in the magnetic layer is smaller, BET is larger, and Hc is larger. The acicular magnetic materials used for such purposes, preferably, are contained in the magnetic primer layer has a crystal particle size of 300 to 500 Å, a BET surface area of 10 to 40 M²/g, and Hc of 250 to 1000 Oe, while one contained in the upper magnetic layer has a crystal particle size of 150 to 350 Å, a BET surface area of 35 to 80 M²/g, and Hc of 500 to 2000 Oe.

The type of magnetic materials contained in the magnetic layers may be selected according to the final application. For example, the following combinations of the magnetic materials may be used:

| Magnetic Primer Layer | Upper Magnetic Layer |
| --- | --- |
| Magnetic iron oxide | /Co-cont. magnetic iron oxide |
| Co-cont. magnetic iron oxide | /Ferromagnetic iron oxide |
| Co-cont. magnetite | /Ferromagnetic iron metal powder |
| Co-cont. magnetite | /Hexagonal system ferrite |
| Magnetic iron oxide | /Co-cont. magnetite |
| Magnetic iron oxide | /Co-cont. hyper magnetite |

When the magnetic recording medium, such as a home video tape, should accommodate a tape end-detecting optical sensor of a video deck, the magnetite or hyper-magnetite is preferably used in the upper magnetic layer to decrease its light transmission. The magnetite or hyper magnetite can reduce the light transmission of a magnetic layer and also decrease its surface resistivity. Accordingly, magnetite or hyper-magnetite is preferred since it can maintain the surface smoothness of the upper magnetic layer without adding carbon black, and decrease its light transmission and surface resistivity.

Shapes of the magnetic material particles in the magnetic layers may be selected depending on the application of the magnetic recording medium. For example, a magnetic material with a high aspect ratio (of 8 to 12) is used in the magnetic primer layer and orientated in a longitudinal direction with respect to the magnetic recording medium, while a particulate or platelet magnetic material is used in the upper magnetic layer and orientated in a vertical direction with respect to the plane of magnetic recording medium. Further, the aspect ratio of the magnetic material in the magnetic primer layer is preferably smaller than that of the magnetic material in the upper magnetic layer (for example, the aspect ratio in the magnetic primer layer≦8, and that in the upper magnetic layer>8). When the shapes of the magnetic materials are properly selected, the reproducing output is increased over a wide frequency range, and balance (frequency characteristics) is improved.

While independent and separate magnetic materials may be used in each magnetic layer, it is possible to use a mixture of two or more magnetic materials depending on the application of the magnetic recording medium. For example, a mixture of two magnetic materials having different BET and Hc is used in the magnetic primer layer. A magnetic material which has a BET and Hc the same as or larger than the magnetic material with the largest BET and Hc in the magnetic primer layer, is used in the upper magnetic layer. For instance, the following combinations may be selected:

Magnetic primer layer
  Magnetic material A: BET=15–25 m²/g, Hc=300–4500 Oe
  Magnetic material B: BET=30–45 m²/g, Hc=550–7500 Oe
Upper magnetic layer
  Magnetic material C: BET=35–50 m²/g, Hc=600–9000 Oe.

When a mixture of two magnetic materials is used in a layer, the reproducing output can be increased over a wide frequency range, and balance (frequency characteristics) can be also improved without forming multiple magnetic layers.

By increasing packing of the magnetic material in the magnetic primer layer, the porosity of the layer is reduced. This prevents migration of the lubricant in the magnetic primer layer and excessive retention of the lubricant in the magnetic primer layer, and the coating properties of the magnetic paint are improved when the upper magnetic layer is formed by the wet-on-dry method.

The upper magnetic layer may contain carbon black to increase the antistaticity, decrease light transmission or improve the wear resistance and durability. In the present invention, any carbon black may be used. The types of carbon black may be the same or different in the nonmagnetic or magnetic primer layers and upper magnetic layers. The content of carbon black may be the same or different in the nonmagnetic and magnetic layers. Preferably, only the nonmagnetic layer contains carbon black and other conductive powders, while the magnetic layers do not.

In a particularly preferred embodiment, the magnetic primer layer only contains the carbon black while the upper magnetic layer contains no carbon black. The addition of carbon black may decrease the flowability of the paint of a magnetic layer, or deteriorate its surface smoothness. When the upper magnetic layer which directly contacts the magnetic head does not contain carbon black, its surface smoothness is increased and its electromagnetic conversion characteristics are improved. Thus, it is preferable to solve problems such as the prevention of electrification, light transmission, wear resistance and durability by adding carbon black only to the primer layer.

It is preferable to limit 1) DBP oil absorption, 2) average primary particle size and 3) content of carbon black contained in the magnetic primer layer as follows:

1) DBP oil absorption

When the DBP oil absorption is too great, the surface smoothness of the magnetic primer layer deteriorates. When the magnetic paint of the upper magnetic layer is coated on the magnetic primer layer, the primer layer absorbs an excess amount of the solvent of the magnetic paint of the upper magnetic layer, so large DBP oil absorption is not preferred in view of the production method. In particular, the DBP oil absorption of carbon black is less than 100 ml/100 g, more preferably 80 ml/100 g or less.

2) Average primary particle size

When the average primary particle size is too large, the surface smoothness of the magnetic primer layer is not good. The average primary particle size of the carbon black used in the invention is preferably 30 nm or less.

3) Carbon black content

A large carbon black content affects the surface smoothness of the magnetic primer layer. When it is too small, the prevention of electrification, light transmission, wear resistance and durability are decreased. The content of carbon black is preferably from 7 to 13 parts by weight per 100 parts by weight of the magnetic material in the magnetic primer layer.

The carbon black which may be used in the present invention includes MITSUBISHI # 44B (particle size=20 nm, oil absorption=80 ml/100 g), MITSUBISHI MA-7 (particle size=24 nm, oil absorption=65 ml/100 g), MITSUBISHI #52 (particle size=27 nm, oil absorption 63 ml/100 g), MITSUBISHI #950 (particle size=16 nm, oil absorption=74 ml/100 g), MITSUBISHI #1000 (particle size=18 nm, oil absorption=55 ml/100 g), MITSUBISHI #2200B (particle size=18 nm, oil absorption=45 ml/100 g) (all manufactured by Mitsubishi Kasei Co., Ltd.); REVEN 2000B (particle size=20 nm, oil absorption=65 ml/100 g), REVEN 1255 (particle size=23 nm, oil absorption=66 ml/100 g), REVEN 5000 (particle size=12 nm, oil absorption=95 ml/100 g), REVEN 1035 (particle size=27 nm, oil absorption=65 ml/100 g) (all manufactured by Columbia Carbon Co., Ltd.); REAGAL 1400 (particle size=25 nm, oil absorption=70 ml/100 g), REAGAL 660 (particle size=24 nm, oil absorption=60 ml/100 g), BLACK PEARLS L (particle size=24 nm, oil absorption=55 ml/100 g) (all manufactured by CABOT Corporation); and the like.

In the present invention, each layer may contain an abrasive, a curing agent (cross linking agent), a curing aid, a lubricant, a fungicide, a surfactant, or an antistatic agent, depending on the intended application. A conventional abrasive may be used in the present invention. Examples of such abrasives are (a-alumina, g-alumina, chromium oxide (green chromium), silicon carbide, cerium oxide, corundum, artificial diamond, a-iron oxide, silicon nitride, boron nitride, molybdenum carbide, boron carbide, tungsten carbide, titanium carbide, titanium oxide, and the like.

The average particle size of the abrasive is preferably from 0.005 to 3 $\mu$m, more preferably from 0.05 to 1 $\mu$m. The Mohs hardness of the abrasive is preferably at least 4, more preferably at least 7. An a-alumina (having Mohs hardness of at least 8) is particularly preferred. Examples of such a-alumina are HIT-50, HIT-100, AKP20, AKP30 (all manufactured by Sumitomo Chemical Co., Ltd.) and E-440 (manufactured by Saint Gobain Industrial Ceramics).

The abrasives contained in the layers may be the same or different, and their contents may be the same or different, in the nonmagnetic primer layer, magnetic primer layer, and upper magnetic layers. Preferably, only the upper magnetic layer contains the abrasive, while the magnetic and nonmagnetic primer layers do not. The magnetic and nonmagnetic primer layers do not contact the magnetic head or other parts directly, and it is normally not necessary for these layers to contain an abrasive.

To increase the packing of the magnetic material in the magnetic primer layer, the content of the abrasive should be from 3 to 15 parts by weight per 100 parts by weight of the magnetic material contained in the upper magnetic layer.

The curing agent (cross linking agent) used in the present invention may vary widely. For example, a compound having at least two cross-linking functional groups such as isocyanate groups, epoxy groups, and ethylene imine rings in a molecule may be used. Examples of commercially available curing agents are Colonate L, Colonate H, Colonate 2030 and Colonate 20301, Millionate MR and Millionate MTL (all manufactured by Nippon Polyurethane Co., Ltd.), Takenate 500 and Takenate 300S (all manufactured by Takeda Chemical Co., Ltd.), Sumijule T-80, Sumijule 44S, Sumijule L, Desmojule L, Desmojule HL and Desmojule RF (all Manufactured by Sumitomo Bayer Urethane Co., Ltd.), PAPI-135 (manufactured by Kasei Upjohn Co., Ltd.), Epichlone (manufactured by Dainippon Ink Chemicals Co., Ltd.), PAZ 33 (manufactured by Nippon Catalyst Chemical Co., Ltd.), and the like.

The types and amounts of curing agents used in the magnetic layers may be the same or different in the nonmagnetic and magnetic primer layers, and upper magnetic layers. In particular, less curing agent is used in the magnetic or nonmagnetic primer layer than in the upper magnetic layer to maintain the flexibility of the primer layer. For example, the amount of curing agent in the magnetic or nonmagnetic primer layer is less than 50 parts by weight per 100 parts of the total binder weight, while that in the upper magnetic layer is at least 50 parts by weight per 100 parts of the total binder weight. The curing agents with differing numbers of functional groups in a molecule are used, i.e., the number of functional groups in the curing agent used in the magnetic or nonmagnetic primer layer is preferably less than that in the upper magnetic layer.

Any known curing catalyst may be used in the present invention. For example, when polyisocyanate is used as the curing agent, amines such as monoalkylamines, dialkylamines, trialkylamines, quaternary ammonium amine salts, etc.; iron salts of acetylacetonate; organic tin catalysts such as dibutyltin dilaurate; metal oxides; and the like may be used.

The types and amounts of the curing catalysts used in the layers may be the same or different in the magnetic or nonmagnetic primer layers and upper magnetic layers. The preferred amount of curing catalyst is from 0.1 to 30 parts by weight per 100 parts of the total weight of the binder and polyisocyanate curing agent in each layer.

Any known lubricant may be used in the present invention. For example, higher fatty acids and esters of fatty acids, such as higher fatty acids having at least 12 carbon atoms, esters of the higher fatty acids having at least 12 carbon atoms with monohydric alcohols having 3 to 20 carbon atoms, ester of fatty acids having 2 to 10 carbon atoms with the monohydric alcohols having at least 12 carbon atoms, diesters of alkylmonocarboxylic acids with dihydric alcohols, triesters of alylkylmonocarboxylic acids and trihydric alcohols. These compounds may be used independently or as a mixture. Specific examples of higher fatty acids which may be used in the present invention are myristic acid, stearic acid, oleic acid, isostearic acid, etc., and specific examples of the fatty acid esters are butyl myristate, butyl stearate, isocetyl stearate, oleyl oleate, 2-ethylhexyl myristate, 2-ethylhexyl stearate, isostearyl palmitate, butanediol distearate, polyethylene glycol monostearate, trimethylolpropane triolate, etc.

The amount of higher fatty acid used in the invention is not critical. Preferably, the amount of the higher fatty acid is from 0.3 to 5 parts by weight, in particular from 0.8 to 2 parts by weight per 100 parts by weight of magnetic material or nonmagnetic powder in each layer. The amount of fatty acid ester is also not critical and preferably, ranges from 0.5 to 10 parts by weight, in particular from 1 to 5 parts by weight per 100 parts by weight of magnetic material or nonmagnetic powder in each layer. Two or more higher fatty acids may be used in combination. For example, a mixture of stearic acid and myristic acid may be used to eliminate dropout or clogging of the magnetic head caused by crystallization on the upper magnetic layer surface.

Other examples of lubricants used in the present invention are organic compounds such as silicone oils (e.g. dialkylsiloxane, etc.), fluorosilicone oils (e.g. fluoroalkylpolysiloxane, etc.), fatty acid-modified silicone oils, fluoroalcohols, polyolefin waxes, tetrafluoroethylene base waxes, perfluorofatty acids, perfluoroalcohols, perfluorofatty acid esters, alkylsulfonate esters, alkylphosphate esters, and aliphatic amides having at least 12 carbon atoms; inorganic powders such as graphite, graphitized carbon black, carbon black having large particle size of, for example, 0.3 to 2 μm, molybdenum disulfite, fluorographite, calcium carbonate, titanium oxide, zinc oxide, tin oxide; and resin fine particles of benzoguanamine resins, polyolefin resins, melamine resins, polyamide resins, polyimide resins, polyester resins, and polyfluoroethylene resins.

While the lubricant may be compounded in the paint of each layer, a solution or paint comprising the lubricant may be top coated on each layer before or after calendering, or after the magnetic or nonmagnetic primer layers and upper magnetic layers are coated and dried.

Any known fungicide may be used in the present invention. For example, 10,10'-oxybisphenoxysarcine, 2-(4-thiazolyl)-benzimidazole, N-(fluorodichloromethylthio)-phthaliride, 2,4,5,6-tetrachloroisophthalonitrile, dihydroacetoic acid, bis(tributyltin) oxide, salicylanilide p-tolyldiiodemethyl sulfone, triiode allylalcohol, and the like may be used. The amount of fungicide is not critical, and preferably is from 0.01 to 10 parts by weight per 100 parts by weight of the binder in each layer.

An antistatic agent other than the above described surfactant or carbon black may be used in the present invention. Inorganic powders of tin oxide, titanium oxide, zinc oxide, barium sulfate, indium oxide, zinc sulfate, silicon oxide, magnesium carbonate, etc. may be used, the particle surfaces of which are coated with tin oxide-antimony oxide or electroless plated with nickel to impart conductivity. The inorganic powder has better dispersability than carbon black, and does not deteriorate surface smoothness when it is contained in the upper magnetic layer.

The term nonmagnetic layer refers to a primer layer applied to the substrate which contains no magnetic material and comprises a nonmagnetic powder, a binder and a lubricant.

The nonmagnetic primer layer preferably contain a nonmagnetic powder. When the nonmagnetic layer does not contain any nonmagnetic powder, the calendering of the magnetic layer coated thereon may be difficult, and the surface of the magnetic layer cannot be smoothed to a satisfactory level. Accordingly, the electromagnetic conversion characteristics are not improved to a level required for achieving high recording density.

The content of the nonmagnetic powder in the nonmagnetic layer is preferably from 40 to 70% by volume. When the content is less than 40% by volume, the surface of the magnetic layer coated thereon is not smooth enough. In addition, the nonmagnetic layer functions as a lubricant reservoir even when the magnetic layer coated thereon is thin, for example 1.5 μm or less, and cannot hold a sufficient amount of the lubricant when the content of nonmagnetic powder less than 40% by volume. When the content of nonmagnetic powder is too low, the porosity in the nonmagnetic layer is decreased so that the nonmagnetic layer cannot hold a sufficient amount of the lubricant. Therefore, the durability, for example, still durability, of the magnetic recording medium may deteriorate.

When the nonmagnetic powder content exceeds 70% by volume, the adhesion between the nonmagnetic and magnetic layers is decreased, so that the durability and the slitting properties deteriorate and the number of drop outs increases. The nonmagnetic powder is not well dispersed at this concentration level, the surface roughness of the nonmagnetic layer deteriorates, and the surface roughness of the magnetic layer formed on the nonmagnetic powder likewise deteriorates. When magnetic paint is coated on the nonmagnetic layer, the nonmagnetic layer absorbs an excessive amount of the solvent for the magnetic paint, and coating the magnetic layer on the nonmagnetic layer becomes difficult. As a result, the magnetic layer cannot be formed smoothly.

Any conventional nonmagnetic powder may be used, such as inorganic powders like carbon black, graphitized carbon black, graphite, carbon black graft polymer, titanium dioxide, titanium monoxide, a-$Fe_2O_3$, a-FeOOH, g-FeOOR, a-alumina, g-alumina, tin oxide, titanium carbide, silicon carbide, silicon dioxide, silicon nitride, boron nitride, barium carbonate, barium sulfate, zinc white, vanadium pentoxide, indium oxide, zinc sulfide, magnesium carbonate, chromium oxide, etc.; and fine powders of resins such as benzoguanamine resin, polyolefin resin, melamine resin, polyamide resin, polyimide resin, polyester resin, etc.

The average particle size of the nonmagnetic powder is not limited. If the average particle size of the nonmagnetic powder is too large, the surface smoothness of the nonmagnetic primer layer deteriorates, and the surface roughness of the magnetic layer is unacceptable. When the average particle size is too small, the dispersability or dispersion stability of the powder in the paint decreases, and the surface smoothness of the nonmagnetic primer layer deteriorates. Accordingly, the preferred range of the average particle size is from 0.01 to 0.8 μm, in particular, from 0.02 to 0.1 μm for particulate nonmagnetic powder, and the preferred average major axis size is from 0.01 to 0.5 μm, in particular, from 0.05 to 0.3 μm for aciculate particles.

A single nonmagnetic powder, or a combination of two or more kinds of powders may be used in the nonmagnetic primer layer. For example, conductive carbon black may be used in combination with other inorganic powders such as titanium dioxide or a-$Fe_2O_3$. If the inorganic powder is acicular, the surface roughness of the nonmagnetic layer is smoother. The weight ratio of carbon black to the inorganic powder is preferably from 1:99 to 20:80, depending on the kind of carbon black or the intended application. When carbon black has an average particle size of 0.05 μm or less and a DBP oil absorption of 300 ml/100 g or larger, the ratio of carbon black to inorganic powder is preferably from 1:99 to 10:90. When carbon black has an average particle size of 0.03 μm or less and DBP oil absorption of 100 ml/100 g or less, the ratio of carbon black to inorganic powder is preferably from 6:94 to 15:85. If conductivity and light shielding are important, a larger amount of carbon black may be used. When electromagnetic conversion characteristics are most important, smaller amounts of carbon black may be used.

Examples of the inorganic powder which may be used in the nonmagnetic layer are TY-50 and TT055B (both manufactured by Ishihara Industries, Ltd.), KR-310 (manufactured by Titanium Industries, Ltd.), TF100, DHS-235 and DNS-25OBX (all manufactured by Toda Industries, Ltd.), Bayferrox 3910 (manufactured by Bayer), and the like. Examples of carbon black which may be used in the nonmagnetic layer are Ketchen Black EC and Ketchen Black 600 JD (both manufactured by Lion), Black Pearls 200, REAGAL 1400 and REAGAL 660 (all manufactured by Cabot Corporation), MITSUBISHI #44B, MITSUBISHI MA-7, MITSUBISHI #52 and MITSUBISHI 42200B (all manufactured by Mitsubishi Kasei Co., Ltd.), HS-500 (manufactured by Asahi Carbon Co., Ltd.), and the like.

The nonmagnetic powder contained in the nonmagnetic layer may be a conductive powder other than carbon black. For example, inorganic powders of tin oxide, titanium oxide, zinc oxide, barium sulfate, indium oxide, zinc sulfate, silicon oxide, magnesium carbonate, etc. may be used. Particles with electrically conductive surfaces treated by coating or doping with antimony oxide, electroless plating the inorganic powder particles with nickel or copper, or sintering the inorganic powder together with aluminum or an organic aluminum compound may be used. These conductive powders have better dispersability and dispersion stability than carbon black, and may facilitate the dispersion of the paint of the nonmagnetic layer and improve its surface smoothness without using carbon black. These conductive powders are described in Japanese Patent Publication Nos. 55-19896 and 55-19897, and Japanese Patent Kokai Publication Nos. 55-1 62477, 56-41 603, 56-114217 and 56-157438. Specific examples of such conductive powders are SN-100 and ET-300W (both manufactured by Ishihara Industries Ltd.) In 203 (manufactured by Fuji Titanium Industries Ltd.), W-1 and T-1 (both manufactured by Mitsubishi Metal Co., Ltd.).

Any known nonmagnetic support, such as plastic films (e.g. films of polyethylene terephthalate, polyethylene 2,6-naphthalate, polypropylene, cellulose acetate, polyamide, polycarbonate, etc.), paper and the like can be used in the present invention. The thickness of the support may vary, depending on the intended application. For example, the a plastic film used as the nonmagnetic support may be from 5 to 75 μm thick.

Before the formation of the upper magnetic layer, the surface of the primer layer (magnetic or nonmagnetic) should be as smooth as possible. Since the primer layers are generally not calendered before the formation of the upper magnetic layer in the production method of the present invention, drying should be controlled to maintain the surface smoothness of the primer layer. To dry the primer layer slowly, preferably the solvent in the paint for the primer layer contains at least one solvent with a low evaporation rate, such as, for example, cyclohexanone or 1,4-dioxane, in an amount of at least 5% by weight based on the total weight of the solvent. When the content of the solvent with the low evaporation rate is less than 5% by weight, the surface smoothness of the primer layer after drying is not acceptable. Preferably, the content of the solvent with the low evaporation rate is from 20 to 50%, by weight based on the total weight of the solvent.

Preferably, the content of the solvent with the low evaporation rate is increased as the thickness of the primer layer is decreased. A solvent with a relative evaporation rate to butyl acetate (according to ASTM D 3539.76) in the range between 0.2 and 1.8 and good compatibility with the other solvent to be mixed may be used in the primer layer. As noted above, cyclohexanone or 1,4 dioxane are preferred.

Since the primer layers (nonmagnetic or magnetic) contain more polyurethane resin than polyvinyl chloride base resin, a good solvent for the polyurethane resin is preferably added to the solvent of the paint for the primer layer, such as methyl ethyl ketone and tetrahydrofuran.

The solvent of the paint of the upper magnetic layer coated on the primer layer contains at least one of toluene and xylene, preferably in an amount of at least 65% by weight, based on the total weight of the solvent.

In the method for producing the present invention, the paint of the upper magnetic layer is continuously coated without curing the primer layer (i.e., heat treatment at a certain temperature for a certain time) after the formation of the primer layer. Therefore, the uncured primer layer should not be soluble in the solvent used for the paint of the upper magnetic layer. For example, the solvent of the magnetic paint of the upper magnetic layer coated on the primer layer should contain at least one solvent which is a poor solvent for the polyurethane resin, which is one of the preferred binders of the primer layer, preferably in an amount of at least 65% by weight. Since the upper magnetic layer contains more polyvinyl chloride base resin than polyurethane, toluene or xylene, which dissolve the polyvinyl chloride base resin and are poor solvents for the polyurethane contained in the primer layers, are preferably used as solvents for the paint of the upper magnetic layer.

When the content of toluene or xylene is less than 65% by weight, the interface between the primer layer and the upper magnetic layer coated thereon becomes uneven, since the coating is dissolved when the paint of the upper magnetic layer is coated. As a result, the surface smoothness of the formed upper magnetic layer deteriorates, and it is impossible to coat two separate layers in some cases. A mixture of toluene or xylene, which are poor solvents for the polyurethane resin with methyl ethyl ketone and the like, is used in the magnetic paint of the upper magnetic layer. When methyl ethyl ketone is used, the content of toluene or xylene is preferably at least 75% by weight.

The relative solubilities of the solvents and binders of the layers may be determined by known methods. For example, a poor solvent for the polyurethane contained in the primer layer can be selected by adding a small amount of polyurethane resin (e.g. 0.5 g) to an excess amount of a solvent (or a mixed solvent) (e.g. 50 ml). When the polyurethane is added to the solvent and stirred well, and the solvent remains whitely opaque, or the polyurethane does not dissolve, the solvent (or mixed solvent) is judged as a poor solvent for polyurethane.

In the present invention, a wet on-dry coating method is used. The method comprises coating the primer layer on the nonmagnetic support, drying it and continuously coating the paint of the upper magnetic layer directly on the primer layer. The mixing ratios of the polyurethane resin and the polyvinyl chloride base resin contained in the binders are different between the primer layer and the magnetic layer coated thereon, so the properties of the magnetic paints, such as rheology or surface tension, may also be different. Therefore, it is preferable to laminate the upper and primer layers by the wet-on-dry method. When multiple layers are formed by the wet on-dry method in the present invention, the following good effects are achieved:

i) The evenness of the interface between the primer and upper magnetic layers is improved, so the surface smoothness of the upper magnetic layer can be improved.

ii) Properties such as rheology and surface tension are seldom the same between paint containing nonmagnetic powder and paint containing magnetic material. When paints having dissimilar properties are used to form the primer layers and magnetic layers by, for example, adding carbon black to the primer layer or adding a surfactant only to the upper magnetic layer, multiple magnetic and/or nonmagnetic layers can be formed satisfactorily.

iii) The porosity in the upper magnetic layer or the primer layer below can be independently and freely controlled.

iv) The design of the coating head can be simplified, and, for example, a conventional coating head used in gravure coating can be used.

In the method for producing the present invention, the solid content and viscosities of the paints for the magnetic or nonmagnetic primer layers and upper magnetic layers are not critical. In general, the solid content is 50% by weight or less, and the apparent viscosity at a shear rate of 10,000 sec$^{-1}$ is 30 cps or less at 25° C. Preferably, with the magnetic paint of the upper magnetic layer, the solid content is 35% by weight or less, and the viscosity at a shear rate of 10,000 sec$^{-1}$ is 10 cps or less, more preferably 6 cps or less, at 25° C.

If the solid content of the paint of the upper magnetic layer is too high, the solvent is absorbed by the magnetic or nonmagnetic primer layer when the paint is applied to the primer layer, so the apparent viscosity at the shear rate of 10,000 sec$^{-1}$ increases excessively, and the surface of the upper magnetic layer cannot be formed smoothly.

The paints of the magnetic or nonmagnetic primer layers and upper magnetic layers according to the present invention are prepared by kneading and dispersing the magnetic material or nonmagnetic powder, the binders, and, optionally, other additives such as carbon black, the surfactant, the abrasive and the lubricants, in a solvent.

These components may be charged to an apparatus for kneading and dispersing at the same time, or portion by portion. For kneading and dispersing the paints, any known apparatus may be used, such as a kneader, a planetary mixer, an extruder, a homogenizer, a high speed mixer, a sand mill, a ball mill, an attritor, a tornado disperser, a high speed impact mill, and the like. The curing agent may be added to the magnetic paint at any suitable step, for example, after or during dispersion, or just before coating the magnetic paint.

Any known apparatus may be used for coating the magnetic paint on the nonmagnetic support, such as an air doctor coater, a blade coater, an air knife coater, a squeeze coater, a reverse roll coater, a direct gravure coater, a reverse gravure coater, kiss-roll coater, a reverse kiss-roll coater, a microgravure coater, spray coater, a die coater, and the like.

Drying conditions after coating the paint depend on the kinds of solvents and nonmagnetic supports selected. The preferred drying temperature is from 40 to 130° C., and the traveling speed of the nonmagnetic support is from 10 to 900 m/min. For drying, a method using IR, far IR or electron beams may be employed.

Before the magnetic paint is completely dried, the magnetic material may be oriented or deoriented, if necessary. Orientation may be carried out by applying a magnetic field with a permanent magnet or an electromagnet in a longitudinal direction, vertical direction or oblique direction (e.g. at 45 degrees from the plane of nonmagnetic support) and drying the coated magnetic paint inside or outside the magnetic field. Deorientation may be carried out by randomizing the directions of magnetic material particles in a plane or three dimensional direction by alternating or rotating magnetic fields. Any conventional orientation or deorientation methods may be used.

To lubricate the magnetic or nonmagnetic layer with the above described lubricant, a solution containing the lubricant can be top coated on the dried magnetic or nonmagnetic layer using any conventional method.

Any conventional calendering method may be employed to smooth the surface of the magnetic or nonmagnetic layer. The calendering may be carried out using a metal-plated (for example, chromium plated) roll, or an elastic roll made of, for example, nylon or polyamide.

The nonmagnetic support carrying the coated nonmagnetic and magnetic layers is slit in tape form to produce a video tape, an audio tape or a data cartridge tape, or cut out in a disc form to produce a disc-form magnetic recording medium such as a floppy disc. The slit magnetic tape or the disc form magnetic recording medium may be polished (burnished) or cleaned in a subsequent step. In the production of magnetic tapes such as video tapes, polishing and cleaning treatments are performed in the slitting step before the magnetic tape is wound. Following winding, the polishing or cleaning treatment may be performed again.

A sapphire blade, a diamond wheel, a precision polishing tape, a stainless steel roll with a smooth surface, and the like can be used for the polishing treatment. For example, a nonwoven fabric made of, for example, rayon, polyester, nylon, acrylonitrile or mixed fabrics may be used for the cleaning treatment.

A conventional back coating may be formed on a back surface of the coated magnetic recording medium of the present invention to improve running durability and antistatic functions, or to control light transmission. For example, useful back coatings are described in Japanese Patent Kokai Publication Nos. 57-53825, 57-74828, 59-3723, 60-38725, 59-188831, 60-38725, 61-59623, 61-180927 and 62-124624, and EP-A-494 793.

EXAMPLES

I. Production of Sample Tapes With Magnetic Primer Layers

A. Preparation of Magnetic Paints:

The magnetic paints of the upper magnetic layer and magnetic primer layer were prepared in the same manner. The raw materials, except the lubricant B and polyisocyanate shown in the composition Table 1, were well mixed for about 30 minutes using a high speed mixer. The mixture was poured in a sand mill and dispersed using glass beads as media for about 10 minutes to obtain a dispersion. Just before coating, the lubricant B and the polyisocyanate shown in composition table 1 below were added in the amounts shown to the dispersion and mixed for about 20 minutes in the high speed mixer to obtain each of the magnetic paints used in Examples 1–10 and Comparative Examples 1–12.

TABLE 1

|  | Upper Magnetic layer | Lower Magnetic layer |
| --- | --- | --- |
| Magnetic material A<br>Acicular magnetite containing Co on particle surface layer<br>-FE$^{2+}$ content based on the whole iron - 32–34 wt. %<br>-Hc = 650 Oe, BET = 38 m$^2$/g | 70 | 100 |
| Magnetic material B<br>Magnetic iron oxide: g-Fe$_2$O$_3$<br>-Hc = 37-Oe, BET = 20 m$^2$/g | 22 | — |
| Carbon black (MITSUBISHI #52 manufactured by Mitsubishi Kasei) | 8 | — |

TABLE 1-continued

|  | Upper Magnetic layer | Lower Magnetic layer |
|---|---|---|
| -Av. prim. particle size = 27 mm |  |  |
| -DBP oil absorption = 63 ml/100 g |  |  |
| a-Alumina (E-440) | — | 7 |
| -Prim. particle size = 0.2–0.3 mm |  |  |
| -BET = 12–18 m$^2$/g |  |  |
| Total amount of PVC and polyurethane resin | 16 | 12 |
| (Ratio: see other Tables) |  |  |
| -PVC: MR-113 having sulfonic acid metal salt group, epoxy group and hydroxyl group | O | O |
| -Polyurethane resin |  |  |
| (1) Resin having sulfonic acid metal salt group and OH group at position other than molecular ends disclosed in U.S. Pat. No. 5,085,941 | O | X |
| -No. Av. MW = 10,000–12,000 |  |  |
| -Urethane group conc. = 2.1–2.2 mmol/g |  |  |
| (2) UR-5537 having sulfonic acid metal salt group and hydroxy group | X | O |
| -No. Av. MW = 18,000–25,000 |  |  |
| -Urethane group conc. = 1.2–1.3 mmol/100 |  |  |
| Polyisocyanate (SBU-0856 manufactured by Sumitomo Bayer Urethane) | 6 | 6 |
| Phosphate ester disclosed in Japan Patent Kokai Publication No. 5-101373 | — | 4 |
| -Hydrophobic part: polypropylene glycol chain having terminal hydroxyl groups |  |  |
| -Hydrophilic group: monoalkyl phosphate ester |  |  |
| -MW = about 800 |  |  |
| Lubricant A: Myristic acid | 1 | 0.8 |
| Lubricant B: Butyl stearate | 1 | 1 |

B. Formation of Magnetic Layers:

As shown in FIG. 1, the magnetic paints 17 of the magnetic primer layer were coated on the nonmagnetic support 2 using the coating head 3, oriented in a longitudinal direction by the first orientation apparatus 5, and dried by passing the nonmagnetic support through the first oven 6.

Subsequently, without heat treating the magnetic primer layer, the magnetic paint 18 of the upper magnetic layer was coated directly on the magnetic primer layer, oriented by the second orientation apparatus 9, and dried in the second oven 10, followed by calendering and winding as a raw sheet (see FIG. 1).

Direct gravure coaters were used as the coating heads in both coating steps. A polyethylene terephthalate film ("NEST II" manufactured by Toray) with a thickness of 14.6 μm was used as the nonmagnetic support.

The magnetic field intensity of the orientation apparatus was 1000 Gauss in the first orientation apparatus and 3000 Gauss in the second orientation apparatus. The calendering was performed using a chromium-plated roll at a treating temperature of 50° C. under pressure of 280 kg/cm.

In Examples 1–10 and Comparative Examples 1–12, after formation of the upper magnetic layer, the raw sheet was cured at 25° C. for about 24 hours and slit in a width of ½ inch, the upper magnetic layer surface was polished and cleaned, and the back surface was cleaned. The treated tape was wound in a suitable length to fabricate a video cassette tape for evaluation of properties.

C. Examples 1–10 and Comparative Examples 1–12

Example 1

Weight ratios of the polyurethane resin to the polyvinyl chloride base resin were 33:67 and 88:12 in the upper and primer magnetic layers, respectively, and the magnetic paints were successively coated so that thicknesses of the upper and magnetic primer layers were 1.1 μm and 1.4 μm, respectively.

Solvent compositions of the magnetic paints were such that a weight ratio of toluene to methyl ethyl ketone in the upper magnetic layer was 75:25, and that of cyclohexanone to methyl ethyl ketone in the magnetic primer layer was 40:60.

Example 2

The video cassette tape was produced in the same manner as in Example 1, except that the weight ratio of the polyurethane resin to the polyvinyl chloride base resin in the magnetic primer layer was changed from 88:12 to 80:20.

Example 3

The video cassette tape was produced in the same manner as in Example 1, except that the weight ratio of the polyurethane resin to the polyvinyl chloride base resin in the magnetic primer layer was changed from 88:12 to 72:28.

Example 4

The video cassette tape was produced in the same manner as in Example 1, except that the weight ratio of the polyurethane resin to the polyvinyl chloride base resin in the upper magnetic layer was changed from 33:67 to 25:75.

Example 5

The video cassette tape was produced In the same manner as in Example 1, except that the weight ratio of the polyurethane resin to the polyvinyl chloride base resin in the upper magnetic layer was changed from 33:67 to 40:60.

Example 6

The video cassette tape was produced in the same manner as in Example 1, except that the thickness of the upper magnetic layer was changed from 1.1 μm to 1.4 μm.

Example 7

The video cassette tape was produced in the same manner as in Example 1, except that the thickness of the magnetic primer layer was changed from 1.4 μm to 1.2 μm.

Example 8

The video cassette tape was produced in the same manner as in Example 1, except that the thickness of the magnetic primer layer was changed from 1.4 μm to 1.7 μm.

Comparative Example 1

The video cassette tape was produced in the same manner as in Example 1, except that the weight ratio of the polyurethane resin to the polyvinyl chloride base resin in the upper magnetic layer was changed from 33:67 to 10:90, which is outside the range of the present invention.

Comparative Example 2

The video cassette tape was produced in the same manner as in Example 1, except that the weight ratio of the polyurethane resin to the polyvinyl chloride base resin in the magnetic primer layer was changed from 88:12 to 63:37 which is outside the range of the present invention.

Comparative Example 3

The video cassette tape was produced in the same manner as in Example 1, except that the weight ratio of the polyurethane resin to the polyvinyl chloride base resin in the upper magnetic layer was changed from 33:67 to 10:90, which is outside the range of the present invention. The weight ratio of the polyurethane resin to the polyvinyl chloride base resin in the magnetic primer layer was changed from 88:12 to 63:37, which is outside the range of the present invention.

Comparative Example 4

The video cassette tape was produced in the same manner as in Example 1, except that the weight ratio of the polyurethane resin to the polyvinyl chloride base resin in the magnetic primer layer was changed from 88:12 to 50:50, which is outside the range of the present invention. The weight ratio of the polyurethane resin to the polyvinyl chloride base resin in the upper magnetic layer was changed from 33:67 to 26:74, which is outside the range of the present invention.

Comparative Example 5

The video cassette tape was produced in the same manner as in Example 1, except that the weight ratio of the polyurethane resin to the polyvinyl chloride base resin in the upper magnetic layer was changed from 33:67 to 50:50, which is outside the range of the present invention.

Comparative Example 6

The video cassette tape was produced in the same manner as in Example 1, except that the weight ratio of the polyurethane resin to the polyvinyl chloride base resin in the magnetic primer layer was changed from 88:12 to 100:0, which is outside the range of the present invention.

Comparative Example 7

The video cassette tape was produced in the same manner as in Example 1, except that the thickness of the magnetic primer layer was changed from 1.4 μm to 2.0 μm, which is outside the range of the present invention.

Comparative Example 8

The video cassette tape was produced in the same manner as in Example 1, except that the thickness of the magnetic primer layer was changed from 1.4 μm to 1.0 μm, which is outside the range of the present invention.

Comparative Example 9

The video cassette tape was produced in the same manner as in Example 1, except that the thickness of the upper magnetic layer was changed from 1.1 μm to 1.7 μm, which is outside the range of the present invention.

Example 9

The video cassette tape was produced in the same manner as in Example 1, except that the weight ratio of toluene to methyl ethyl ketone in the magnetic paint of the upper magnetic layer was changed from 75:25 to 65:35.

Comparative Example 10

The video cassette tape was produced in the same manner as in Example 1, except that the weight ratio of toluene to methyl ethyl ketone in the magnetic paint of the upper magnetic layer was changed from 75:25 to 60:40, which is outside the range of the present invention.

Comparative Example 11

The video cassette tape was produced in the same manner as in Example 1, except that the weight ratio of toluene to methyl ethyl ketone in the magnetic paint of upper magnetic layer was changed from 75:25 to 55:45, which is outside the range of the present invention.

Example 10

The video cassette tape was produced in the same manner as in Example 1, except that the weight ratio of cyclohexanone to methyl ethyl ketone in the magnetic paint of the magnetic primer layer was changed from 40:60 to 10:90.

Comparative Example 12

The video cassette tape was produced in the same manner as in Example 1, except that the weight ratio of cyclohexanone to methyl ethyl ketone in the magnetic paint of the magnetic primer layer was changed from 40:60 to 0:100, which is outside the range of the present invention.

D. Evaluation of Media

The properties of the video cassette tapes produced in Examples and Comparative Examples were evaluated by the following methods.

(1) Surface roughness (Ra) of the upper magnetic layer Ra (center line average roughness) was measured using a three-dimensional optical surface roughness meter (TOPO-3D manufactured by WYKO Co., Ltd.).

(2) Evaluation of RF output

The RF output means an output of a video (brightness) signal which has been FM converted and recorded.

Using a video tape recorder NV-8200 (manufactured by Matsushita Electric Industrial Co., Ltd.), the RF output was measured under the conditions described in "VHS Video Cassette System Regulations VHS-22" proposed by Japan Victor.

The values in the tables were relative values with RF output in Comparative Example 5 being 0.0 dB.

(3) Evaluation of chroma S/N

The chroma S/N means a ratio of signal to noise of a color signal which has been low band converted and recorded.

Using a video tape recorder NV-8200 (manufactured by Matsushita Electric Industrial Co., Ltd.), the chroma S/N was measured under the conditions described in "VHS Video Cassette System Regulations VHS-22" proposed by Japan Victor.

The values in the tables were relative values with chroma S/N in Comparative Example 5 being 0.0 dB.

(4) Evaluation of Slitting Properties

The slitting properties was evaluated by observing the enlarged (×40,000) scanning electron microphotograph of an edge region of the slit magnetic tape with the naked eye, and ranked according to the following criteria:

Excellent: No cracking or breakage was found in the edge regions of the magnetic layers.

Good: Some cracks were found in the edge regions of the magnetic layers, but there was no broken areas.

Bad: Some cracks were found in the edge regions of the magnetic layers, and there were partially broken areas.

Very bad: The broken areas were found over all the edge regions of the magnetic layers.

(5) Evaluation of Still Durability

The still durability was evaluated using a video tape recorder NV-8200 (manufactured by Matsusluta Electric Industrial Co., Ltd.) at room temperature and humidity. After measuring one sample tape, the video head was cleaned and then the next sample tape was measured. The measured value indicated a time period in which the reproducing RF output decreased to a half of the original RF output.

(6) Measurement of Drop Outs

The drop outs were measured using a video tape recorder NV-8200 (manufactured by Matsushita Electric Industrial Co., Ltd.) at room temperature and humidity. The measured value was the number of drop outs per minute. A decrease by 10 dB or larger for 15 msec was counted as one drop out.

E. Results

The results are shown in Tables 2–5 below.

TABLE 2

| Ex. No. | 1 | 2 | 3 | 4 | 5 | 6 |
|---|---|---|---|---|---|---|
| Wt. ratio of Polyurethane to PVC | | | | | | |
| -Upper layer | 33:67 | 33:67 | 33:67 | 25:75 | 40:60 | 33:67 |
| -Lower layer | 88:12 | 80:20 | 72:28 | 88:12 | 88:12 | 88:12 |
| Thickness of magnetic layer (mm) | | | | | | |
| -Upper layer | 1.1 | 1.1 | 1.1 | 1.1 | 1.1 | 1.4 |
| -Lower layer | 1.4 | 1.4 | 1.4 | 1.4 | 1.4 | 1.4 |
| Solvents in magnetic paint | | | | | | |
| -Upper layer (toluene:MEK) | 75:25 | 75:25 | 75:25 | 75:25 | 75:25 | 75:25 |
| -Lower Layer (cyclohexanone: MEK) | 40:60 | 40:60 | 40:60 | 40:60 | 40:60 | 40:60 |
| Ra (nm) of upper magnetic layer | 7 | 8 | 9 | 10 | 8 | 7 |
| RF output (dB) | +2.0 | +1.9 | +1.8 | +1.6 | +1.9 | +2.0 |
| Chroma S/N (dB) | +2.3 | +2.0 | +1.7 | +1.2 | +2.1 | +2.2 |
| Slitting property | Excellent | Excellent | Good | Excellent | Good | Good |
| Still durability (min.) | >180 | >180 | 170 | >180 | 160 | 160 |
| Drop outs (No./min.) | <5 | <5 | 7 | <5 | 9 | 8 |

TABLE 3

| Ex. No. | 7 | 8 | C.1 | C.2 | C.3 | C.4 |
|---|---|---|---|---|---|---|
| Wt. ratio of Polyurethane to PVC | | | | | | |
| -Upper layer | 33:67 | 33:67 | 10:90 | 33:67 | 10:90 | 26:74 |
| -Lower layer | 88:12 | 88:12 | 88:12 | 63:37 | 63:37 | 50:50 |
| Thickness of magnetic layer (mm) | | | | | | |
| -Upper layer | 1.1 | 1.1 | 1.1 | 1.1 | 1.1 | 1.1 |
| -Lower layer | 1.2 | 1.7 | 1.4 | 1.4 | 1.4 | 1.4 |
| Solvents in magnetic paint | | | | | | |
| -Upper layer (toluene:MEK) | 75:25 | 75:25 | 75:25 | 75:25 | 75:25 | 75:25 |
| -Lower Layer (cyclohexanone: MEK) | 40:60 | 40:60 | 40:60 | 40:60 | 40:60 | 40:60 |
| Ra (nm) of upper magnetic layer | 9 | 10 | 11 | 15 | 17 | 16 |
| RF output (dB) | +1.8 | +1.5 | +1.0 | −1.2 | −2.0 | −2.5 |
| Chroma S/N (dB) | +1.5 | +1.2 | +1.0 | −3.4 | −3.8 | −4.0 |
| Slitting property | Good | Excellent | Bad | Very bad | Bad | Very bad |
| Still durability (min.) | 150 | >180 | 80 | 50 | 90 | 30 |

TABLE 3-continued

| Ex. No. | 7 | 8 | C.1 | C.2 | C.3 | C.4 |
|---|---|---|---|---|---|---|
| Drop outs (No./min.) | 9 | <5 | 15 | 30 | 50 | 80 |

TABLE 4

| Ex. No | C.5 | C.6 | C.7 | C.8 | C.9 | 9 |
|---|---|---|---|---|---|---|
| Wt. ratio of Polyurethane to PVC | | | | | | |
| -Upper layer | 50:50 | 33:67 | 33:67 | 33:67 | 33:67 | 33:67 |
| -Lower layer | 88:12 | 100:0 | 88:12 | 88:12 | 88:12 | 88:12 |
| Thickness of magnetic layer (mm) | | | | | | |
| -Upper layer | 1.1 | 1.1 | 1.1 | 1.1 | 1.7 | 1.1 |
| -Lower layer | 1.4 | 1.4 | 2.0 | 1.0 | 1.4 | 1.4 |
| Solvents in magnetic paint | | | | | | |
| -Upper layer (toluene:MEK) | 75:25 | 75:25 | 75:25 | 75:25 | 75:25 | 65:35 |
| -Lower layer (cyclohexanone:MEK) | 40:60 | 40:60 | 40:60 | 40:60 | 40:60 | 40:60 |
| Ra (nm) of upper magnetic layer | 13 | 8 | 13 | 12 | 8 | 10 |
| RF output (dB) | ±0.0 | +2.0 | +1.1 | +1.3 | +2.2 | +1.5 |
| Chroma S/N (dB) | ±0.0 | +2.3 | +1.2 | +1.4 | +1.8 | +1.1 |
| Slitting property | Good | Good | Excellent | Bad | Very bad | Very bad |
| Still durability | 80 | 60 | >180 | 60 | 90 | >180 |
| Drop outs (No./min.) | 35 | 10 | <5 | 11 | 13 | <5 |

TABLE 5

| Ex. No. | C.10 | C.11 | 10 | C.12 |
|---|---|---|---|---|
| Wt. ratio of Polyurethane to PVC | | | | |
| -Upper layer | 33:67 | 33:67 | 33:67 | 33:67 |
| -Lower layer | 88:12 | 88:12 | 88:12 | 88:12 |
| Thickness of magnetic layer (mm) | | | | |
| -Upper layer | 1.1 | 1.1 | 1.1 | 1.1 |
| -Lower layer | 1.4 | 1.4 | 1.4 | 1.4 |
| Solvents in magnetic paint | | | | |
| -Upper layer (toluene:MEK) | 60:40 | 55:45 | 75:25 | 75:25 |
| -Lower layer (cyclohexanone:MEK) | 40:60 | 40:60 | 10:90 | 0:100 |
| Ra (nm) of upper magnetic layer | 19 | 25 | 12 | 18 |
| RF output (dB) | −0.9 | −2.1 | +1.5 | −0.7 |
| Chroma S/N (dB) | −3.3 | −3.9 | +1.1 | −2.8 |
| Slitting property | Excellent | Good | Excellent | Good |
| Still durability (min.) | >180 | 130 | >180 | 140 |
| Drop outs (No./min.) | 30 | 130 | <5 | 50 |

II. Production of Sample Tapes With Nonmagnetic Primer Layers

A. Preparation of Paints:

The paints of the nonmagnetic primer layer and the upper magnetic layers were prepared in the same manner as in Part I above. The raw materials, except the lubricant B and polyisocyanate shown in Composition Table 6 was well mixed for about 30 minutes using a high speed mixer. The mixture was poured in a sand mill and dispersed using glass beads for about 10 minutes to obtain a dispersion.

Just before coating, the lubricant B and the polyisocyanate shown in the composition table were added in the amounts shown in the table to the dispersion and mixed for about 20 minutes in a high speed mixer to obtain each of the magnetic paints used in Examples 11–17 and Comparative Examples 13–22.

The nonmagnetic powder was present in the nonmagnetic primer layer at about 53% by weight. The organic solvents used in the paint of the nonmagnetic layer were Cyclohexanone/methyl ethyl ketone, and the organic solvents used in the paint of magnetic layer were toluene/methyl ethyl ketone. The ratios of the solvents are shown in the Tables below.

The solid content in the paints of the nonmagnetic primer layer was 30 to 35% by weight, and in the paint of the upper magnetic layer 20 to 35% by weight. The solid content was adjusted so the apparent viscosity at the shear rate of 10,000 sec$^{-1}$ of the magnetic paint was 4 to 10 cps.)

TABLE 6

Composition (parts by weight)

| | Nonmagnetic layer | Magnetic Layer |
|---|---|---|
| Magnetic material | | 100 |
| Barium Ferrite | | |
| -AV. plate diameter: 0.06 mm | | |
| -Hc = 1200 Oe | | |
| -Plate ratio(diameter/thickness) = 3.3 | | |
| Nonmagnetic powder | 97 | |
| (DNS-235) | | |
| a-Fe$_2$O$_3$ | | |
| -Av. major axis size = 0.25 mm | | |
| -Aspect ratio = 7.7 | | |
| Carbon Black | 3 | — |
| (KETCHEN BLACK EC 600JD) | | |
| -Oil absorption - 495 ml/100 g | | |
| -BET = 1270 m$^2$/g | | |
| a-Alumina (E-440) | — | 7 |
| -Prim. particle size = 0.2–0.3 mm | | |
| -BET = 12–18 m$^2$/g | | |
| Total amount of PVC and polyurethane resin | 16 | 12 |
| (Ratio: see other Tables) | | |
| -PVC: MR-113 having sulfonic acid metal salt group, epoxy group and hydroxyl group | O | O |
| -Polyurethane resin | | |
| (1) Resin having sulfonic acid metal salt group and OH group at position other than molecular ends disclosed in U.S. Pat. No. 5,085,941 | O | X |
| -No. Av. MW = 10,000–12,000 | | |
| -Urethane group conc. = 2.1–2.2 mmol/g | | |
| (2) UR-5537 having sulfonic acid metal salt group and hydroxy group | X | O |
| -No. Av. MW = 18,000–25,000 | | |
| -Urethane group conc. = 1.2–1.3 mmol/100 g | | |
| Polyisocyanate | 6 | 6 |
| (SBU-0856 manufactured by Sumitomo Bayer Urethane | | |
| Phosphate ester disclosed in Japan Patent Kokai Publication No. 5-101373 | — | 4 |
| -Hydrophobic part: polypropylene glycol chain having terminal hydroxyl groups | | |
| -Hydrophilic group: monoalkyl phosphate ester | | |
| -MW = about 800 | | |
| Lubricant A: Myristic acid | 1 | 0.8 |
| Lubricant B: Butyl stearate | 1 | 1 |

B. Formation of Layers

The paint 17 of the nonmagnetic primer layer was coated on the nonmagnetic support 2 using the first coating head 3, and dried by passing the nonmagnetic support through the first oven 6.

Subsequently, without heat treating the nonmagnetic layer, the magnetic paint 18 of upper magnetic layer was coated directly on the nonmagnetic primer layer using the second coating head 7, oriented by the orientation apparatus 9, and dried in the second oven 10, followed by calendering and winding as a raw sheet (see FIG. 1).

direct gravure coaters were used as the coating heads in both coating steps. A polyethylene terephthalate film ("NEST II" manufactured by Toray) with a thickness of 14.6 μm was used as the nonmagnetic support.

The magnetic filed intensity of the orientation apparatus was 3000 Gauss. The calendering was carried out using a chromium-plated roll at a temperature of 50° C. under pressure of 280 kg/cm.

The thickness of the upper magnetic layer was 0.7 to 0.8 μm, and that of the nonmagnetic primer layer was 1.7 to 1.8 μm.

After formation of the upper magnetic layer, the raw sheet was cured at 25° C. for about 24 hours and slit in a width of ½ inch, the magnetic layer surface was polished, and the magnetic layer surface and the back surface were cleaned. The treated tape was wound in a suitable length to fabricate a video cassette tape for evaluation of properties.

C. Examples 11–17 and Comparative Examples 13–22

Example 11

The weight ratios of the polyurethane resin to the polyvinyl chloride base resin were 33:67 and 88:12 in the upper magnetic and nonmagnetic primer layers, respectively, and the paints of the nonmagnetic layer and upper magnetic layer were successively coated.

Solvent compositions of the paints were such that the weight ratio of toluene to methyl ethyl ketone in the upper magnetic layer was 75:25, and that of cyclohexanone to methyl ethyl ketone in the nonmagnetic primer layer was 40:60.

Example 12

The video cassette tape was produced in the same manner as in Example 11, except that the weight ratio of the polyurethane resin to the polyvinyl chloride base resin in the nonmagnetic primer layer was changed from 88:12 to 80:20.

Example 13

The video cassette tape was produced in the same manner as in Example 11, except that the weight ratio of the polyurethane resin to tile polyvinyl chloride base resin in the nonmagnetic primer layer was changed from 88:12 to 72:28.

Example 14

The video cassette tape was produced in the same manner as in Example 11, except that the weight ratio of the polyurethane resin to the polyvinyl chloride base resin in the upper magnetic layer was changed from 33:67 to 25:75.

Example 15

The video cassette tape was produced in the same manner as in Example 11, except that the weight ratio of the polyurethane resin to the polyvinyl chloride base resin in the upper magnetic layer was changed from 33:67 to 40:60.

Comparative Example 13

The video cassette tape was produced in the same manner as in Example 11, except that the weight ratio of the polyurethane resin to the polyvinyl chloride base resin in the upper magnetic layer was changed from 33:67 to 10:90 which is outside the range of the present invention.

Comparative Example 14

The video cassette tape was produced in the same manner as in Example 11, except that the weight ratio of the polyurethane resin to the polyvinyl chloride base resin in the nonmagnetic primer layer was changed from 88:12 to 63:37, which is outside the range of the present invention.

Comparative Example 15

The video cassette tape was produced in the same manner as in Example 11, except that the weight ratio of the polyurethane resin to the polyvinyl chloride base resin in the upper magnetic layer was changed from 33:67 to 10:90, which is outside the range of the present invention. The weight ratio of the polyurethane resin to the polyvinyl chloride base resin in the nonmagnetic primer layer was changed from 88:12 to 63:37, which is outside the range of the present invention.

Comparative Example 16

The video cassette tape was produced in the same manner as in Example 11, except that the weight ratio of the polyurethane resin to the polyvinyl chloride base resin in the nonmagnetic primer layer was changed from 88:12 to 50:50, which is outside the range of the present invention. The weight ratio of the polyurethane resin to the polyvinyl chloride base resin in the upper magnetic layer was changed from 33:67 to 26:74 which is outside the range of the present invention.

Comparative Example 17

The video cassette tape was produced in the same manner as in Example 11, except that the weight ratio of the polyurethane resin to the polyvinyl chloride base resin in the upper magnetic layer was changed from 33:67 to 50:50, which is outside the range of the present invention.

Comparative Example 18

The video cassette tape was produced in the same manner as in Example 11, except that the weight ratio of the polyurethane resin to the polyvinyl chloride base resin in the nonmagnetic primer layer was changed from 88:12 to 100:0, which is outside the range of the present invention.

Example 16

The video cassette tape was produced in the same manner as in Example 11, except that the weight ratio of toluene to methyl ethyl ketone in the magnetic paint of the upper magnetic layer was changed from 75:25 to 65:35.

Comparative Example 19

The video cassette tape was produced in the same manner as in Example 11, except that the weight ratio of toluene to methyl ethyl ketone in the magnetic paint of the upper magnetic layer was changed from 75:25 to 60:40, which is outside the range of the present invention.

Comparative Example 20

The video cassette tape was produced in the same manner as in Example 11, except that the weight ratio of toluene to methyl ethyl ketone in the magnetic paint of the upper magnetic layer was changed from 75:25 to 55:45, which is outside the range of the present invention.

Example 17

The video cassette tape was produced in the same manner as in Example 11, except that the weight ratio of cyclohexanone to methyl ethyl ketone in the magnetic paint of nonmagnetic primer layer was changed from 40:60 to 10:90.

Comparative Example 21

The video cassette tape was produced in the same manner as in Example 11, except that the weight ratio of cyclohexanone to methyl ethyl ketone in the magnetic paint of nonmagnetic primer layer was changed from 40:60 to 0:100, which is outside the range of the present invention.

D. Evaluation of Media

The properties of the video cassette tapes produced in Examples and Comparative Examples were evaluated by the methods described in Part I.

E. Results

The results are shown in Tables 7–9 below.

TABLE 7

| Ex. No. | 1 | 2 | 3 | 4 | 5 | C.1 |
|---|---|---|---|---|---|---|
| Wt. ratio of Polyurethane to PVC | | | | | | |
| -Magnetic layer | 33:67 | 33:67 | 33:67 | 25:75 | 40:60 | 10:90 |
| -Nonmag. layer | 88:12 | 80:20 | 72:28 | 88:12 | 88:12 | 88:12 |
| Solvents in paint of | | | | | | |
| -Magnetic layer (toluene:MEK) | 75:25 | 75:25 | 75:25 | 75:25 | 75:25 | 75:25 |
| -Nonmag. layer (cyclohexanone: MEK) | 40:60 | 40:60 | 40:60 | 40:60 | 40:60 | 40:60 |
| Ra (nm) of magnetic layer | 5 | 6 | 7 | 8 | 6 | 10 |
| RF output (dB) | +2.6 | +2.2 | +1.7 | +1.1 | +2.5 | −0.5 |
| Slitting property | Excellent | Excellent | Good | Excellent | Good | Bad |
| Still durability (min.) | >180 | >180 | 160 | >180 | 150 | 90 |
| Drop outs (No./min.) | <5 | <5 | 7 | <5 | 9 | 15 |

TABLE 8

| Ex. No. | C.2 | C.3 | C.4 | C.5 | C.6 | 6 |
|---|---|---|---|---|---|---|
| Wt. ratio of Polyurethane to PVC | | | | | | |
| -Magnetic layer | 33:67 | 10:90 | 26:74 | 50:50 | 33:67 | 33:67 |
| -Nonmag. layer | 63:37 | 63:37 | 50:50 | 88:12 | 100:0 | 88:12 |
| Solvents in paint of | | | | | | |
| -Magnetic layer (toluene:MEK) | 75:25 | 75:25 | 75:25 | 75:25 | 75:25 | 65:35 |
| -Nonmag. layer (cyclohexanone: MEK) | 40:60 | 40:60 | 40:60 | 40:60 | 40:60 | 40:60 |
| Ra (nm) of magnetic layer | 12 | 14 | 13 | 9 | 6 | 8 |
| RF output o | −2.5 | −3.2 | −2.9 | ±0.0 | +2.2 | +1.0 |
| Slitting property | Very bad | Bad | Very bad | Good | Good | Excellent |
| Still durability (min.) | 40 | 80 | 30 | 90 | 60 | >180 |
| Drop outs (No./min.) | 9 | <5 | 15 | 30 | 50 | 80 |

TABLE 9

| Ex. No. | C.7 | C.8 | 7 | C.9 |
|---|---|---|---|---|
| Wt. ratio of Polyurethane to PVC | | | | |
| -Magnetic layer | 33:67 | 33:67 | 33:67 | 33:67 |
| -Nonmag. layer | 88:12 | 88:12 | 88:12 | 88:12 |
| Solvents in paint of | | | | |
| -Magnetic layer (toluene:MEK) | 60:40 | 55:45 | 75:25 | 75:25 |
| -Nonmag. layer (cyclohexanone: MEK) | 40:60 | 40:60 | 10:90 | 0.100 |
| Ra (nm) of Magnetic layer | 14 | 17 | 9 | 14 |
| RF output (dB) | −3.2 | −5.4 | +0.3 | −3.1 |
| Slitting property | Excellent | Good | Excellent | Good |
| Still durability (min.) | >180 | 130 | >180 | 140 |
| Drop outs (no./min.) | 30 | 140 | <5 | 60 |

We claim:

1. A wet-on-dry coated magnetic recording medium comprising (i) a nonmagnetic support, (ii) a nonmagnetic primer layer containing a nonmagnetic powder formed on said nonmagnetic support, and (iii) an upper magnetic layer formed on said nonmagnetic primer layer, wherein said nonmagnetic primer layer and said upper magnetic layer comprise, as a binder, a polyurethane resin and a polyvinyl chloride resin, and the weight ratio of the polyurethane resin to the polyvinyl chloride resin in said nonmagnetic primer layer is from 70:30 to 90:10, and the weight ratio of the polyurethane resin to the polyvinyl chloride resin in said upper magnetic layer is from 20:80 to 40:60.

2. The coated magnetic recording medium as claimed in claim 1, wherein the urethane concentration in the polyurethane resin contained in said primer layer is from 2.0 to 3.6 mmol/g, and the urethane concentration in the polyurethane resin contained in said upper magnetic layer is 1.5 mmol/g or less.

3. The coated magnetic recording medium as claimed in claim 1, wherein the polyurethane resin contained in said primer layer has a number average molecular weight of 1000 to 15,000.

4. The coated magnetic recording medium as claimed in claim 1, wherein the polyurethane resin contained in said primer layer has a sulfonic acid metal salt group and a hydroxyl group at a position along the molecular backbone, and the polyvinyl chloride base resin contained in said primer layer has a sulfonic acid metal salt group, a hydroxyl group and an epoxy group.

5. The coated magnetic recording medium as claimed in claim 1, wherein said upper magnetic layer further comprises a surfactant which has a polypropylene glycol chain with a terminal hydroxyl group and a monoalkyl phosphate group.

6. The coated magnetic recording medium as claimed in claim 1, wherein said nonmagnetic layer contains 40 to 70% by volume of nonmagnetic powder.

7. The coated magnetic recording medium as claimed in claim 1, wherein the thickness of said primer layer is from 1.1 to 1.8 µm, and the thickness of said upper magnetic layer is 1.5 µm or less.

8. A method for producing a coated magnetic recording medium, comprising steps of (a) coating a paint for a nonmagnetic primer layer on a nonmagnetic support, wherein the paint for said primer layer comprises (i) at least 5% by weight, based on the total weight of the solvent, of a solvent selected from the group consisting of cyclohexanone and 1,4-dioxane, (ii) a nonmagnetic powder, and (iii) a binder of a polyurethane resin and a polyvinyl chloride base resin, wherein the weight ratio of the polyurethane resin to the polyvinyl chloride base resin in the paint for said primer layer is from 70:30 to 90:10;

(b) drying the paint for the primer layer to form a primer layer;

(c) coating a magnetic paint on the primer layer, wherein the magnetic paint comprises at least 65% by weight, based on the total weight of the solvent, of a solvent selected from the group consisting of toluene and xylene, the magnetic paint further comprising, as a binder, a polyurethane resin and a polyvinyl chloride base resin, wherein the weight ratio of the polyurethane resin to the polyvinyl chloride base resin in the magnetic paint is from 20:80 to 40:60; and (d) drying the magnetic paint to form an upper magnetic layer.

9. A coated magnetic recording medium comprising a nonmagnetic support, a nonmagnetic primer layer containing nonmagnetic powder formed on said nonmagnetic support, a magnetic primer layer formed on said nonmagnetic layer, and an upper magnetic layer formed on said primer layer, wherein said nonmagnetic primer layer, said magnetic primer layer and said upper magnetic layer comprise, as a binder, a polyurethane resin and a polyvinyl chloride resin, and the weight ratio of the polyurethane resin to the polyvinyl chloride resin in said nonmagnetic primer layer and said magnetic primer layer is from 70:30 to 90:10, and the weight ratio of the polyurethane resin to the polyvinyl chloride resin in said upper magnetic layer is from 20:80 to 40:60.

* * * * *

UNITED STATES PATENT AND TRADEMARK OFFICE
CERTIFICATE OF CORRECTION

PATENT NO.: 5,932,330
DATED: August 3, 1999
INVENTOR(S): Ohkubo et al.

It is certified that errors appear in the above-identified patent and that said Letters Patent is hereby corrected as shown below:

Col. 1, line 50, "2 mm" should be --2 µm--.
Col. 1, line 60, "the 'b 257publication" should be --the '257 publication--.
Col. 7, line 20, "1.8 mm" should be --1.8 µm--.
Col. 19, line 6, "-Av. prim. particle size = 27 mm" should be deleted.
Col. 19, line 9, "-Prim. particle size = 0.2-0.3 mm" should be deleted.
Col. 22, line 13, "40:60to" should be --40:60 to--.
Col. 23, approximately line 22, "(mm)" should be --(µm)--.
Col. 23, approximately line 50, "(mm)" should be --(µm)--.
Col. 24, approximately line 18, "(mm)" should be --(µm)--.
Col. 24, approximately line 44, "(mm)" should be --(µm)--.
Col. 25, approximately line 27, "mm" should be --µm--.
Col. 25, approximately line 32, "mm" should be --µm--.
Col. 25, approximately line 37, "mm" should be --µm--.
Col. 28, line 6, "40:60to" should be --40:60 to--.
Col. 28, line 13, "40:60to" should be --40:60 to--.

Signed and Sealed this

Fifth Day of December, 2000

Attest:

Q. TODD DICKINSON

Attesting Officer

Director of Patents and Trademarks